United States Patent
Fujikawa et al.

(12)

(10) Patent No.: US 6,474,428 B1
(45) Date of Patent: Nov. 5, 2002

(54) ELECTRIC TORQUE CONVERTER MOUNTED ON PARALLEL HYBRID VEHICLE

(75) Inventors: Masato Fujikawa, Shizuoka (JP); Yasuo Sumi, Kanagawa (JP); Kenji Nakashima, Shizuoka (JP)

(73) Assignee: Jatco Transtechnology Ltd., Fuji (JP)

( * ) Notice: Subject to any disclaimer, the term of this patent is extended or adjusted under 35 U.S.C. 154(b) by 0 days.

(21) Appl. No.: 09/691,062

(22) Filed: Oct. 19, 2000

(30) Foreign Application Priority Data

Oct. 19, 1999 (JP) .......................................... 11-296510

(51) Int. Cl.⁷ ................................................. B60K 1/00
(52) U.S. Cl. ........................... 180/65.2; 180/65.3; 475/5
(58) Field of Search ............................... 180/65.2, 65.3; 475/5, 2

(56) References Cited

U.S. PATENT DOCUMENTS

| | | | | |
|---|---|---|---|---|
| 5,387,161 A | * | 2/1995 | Shibahata ....................... | 475/5 |
| 5,558,588 A | * | 9/1996 | Schmidt ......................... | 475/5 |
| 5,730,676 A | * | 3/1998 | Schmidt ......................... | 475/5 |
| 5,856,709 A | * | 1/1999 | Ibaraki et al. ................. | 290/45 |
| 5,875,691 A | * | 3/1999 | Hata et al. ..................... | 74/661 |
| 5,895,333 A | * | 4/1999 | Morisawa et al. ............. | 475/5 |
| 6,234,930 B1 | * | 5/2001 | Kaneko et al. ................. | 475/5 |
| 6,306,057 B1 | * | 10/2001 | Morisawa et al. ............. | 475/5 |

FOREIGN PATENT DOCUMENTS

JP          09-257121         9/1997

* cited by examiner

Primary Examiner—Kevin Hurley
Assistant Examiner—Tony Winner

(74) Attorney, Agent, or Firm—Foley & Lardner

(57) ABSTRACT

An electric torque converter mounted on a parallel hybrid vehicle employing a parallel hybrid system, using both an internal combustion engine and an electric motor for propulsion, includes an electric motor generator, and a composition-and-distribution mechanism located between the engine and a transmission for mechanically combining torque produced by the engine and torque produced by the motor generator with each other and for mechanically distributing the torque produced by the engine into the motor generator and a transmission input shaft. A converter case of the electric torque converter has a first casing member partitioning the transmission from the electric torque converter, a second casing member located between the engine and the transmission for partitioning the electric torque converter from the exterior, and a third casing member partitioning the motor generator from the composition-and-distribution mechanism. The third casing member has a large-diameter portion fixed to the first casing member, a medium-diameter portion housing therein the composition-and-distribution mechanism and placing therearound a motor generator rotor so that part of the motor generator rotor overlaps with the composition-and-distribution mechanism in a radial direction, and a small-diameter portion whose inner periphery rotatably supports a motor generator rotor support arranged coaxially with the transmission input shaft.

7 Claims, 5 Drawing Sheets

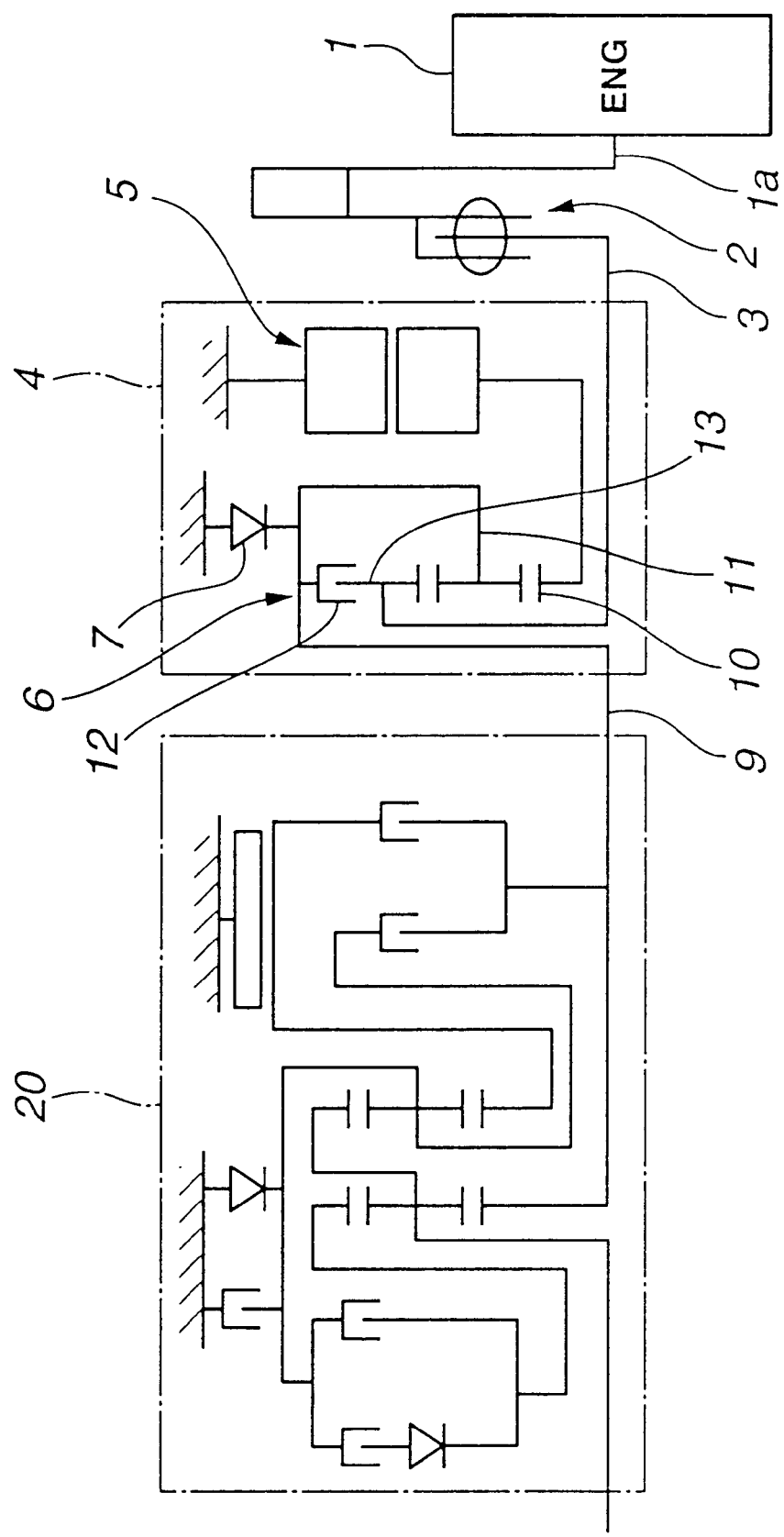

ELECTRIC TORQUE CONVERTER MOUNTED ON PARALLEL HYBRID VEHICLE

BACKGROUND OF THE INVENTION

1. Field of the Invention

The present invention relates to an electric torque converter used in an automatic transmission and mounted on a hybrid vehicle employing a parallel hybrid system, using both an internal combustion engine and an electric motor (an electric motor generator) for vehicle propulsion.

2. Description of the Prior Art

In recent years, it is strongly desired to improve fuel economy of automotive vehicles, for the purpose of protecting global atmospheric and saving earth resources. In order to reduce fuel consumption, there have been proposed and developed various hybrid vehicles. Hybrid vehicles in which an internal combustion engine and an electric motor (an electric motor/generator), both serving as a propelling power source, are arranged in series to each other or in parallel with each other, and operate at various running modes, such as a motorpropelled vehicle driving mode, an engine-propelled vehicle driving mode, a regenerative mode, a power-assist mode, an electric power generation mode, and the like. For example, during the power-assist mode, the engine (a primary power source) is assisted by the electric motor (a secondary power source). Also, when the hybrid vehicle is decelerating, the hybrid system operates at the regenerative mode during which the electric motor is employed to convert kinetic energy of the vehicle into electric energy and to regenerate electricity which is stored in a car battery. One such parallel hybrid system has been disclosed in Japanese Patent Provisional Publication No. 9-257121. FIG. 5 shows a simplified skeleton diagram of the parallel hybrid system disclosed in the Japanese Patent Provisional Publication No. 9-257121. As shown in FIG. 5, the parallel hybrid system includes an internal combustion engine 112 serving as a primary power source, an electric torque converter 124, and an automatic transmission 118, and also these component parts 112, 124, and 118 are arranged in the longitudinal direction of the vehicle, in that order. The electric torque converter 124 is constructed by an electric motor generator 114 capable of functioning as a generator (generating electricity for example in a regenerative state) as well as an electric motor (driven by electricity for example in a power running state), and a single-pinion planetary-gear system 116 serving as a composition/distribution mechanism capable of mechanically combining two different forces, that is, torque produced by the engine and torque produced by the motor/generator, with each other, and of mechanically distributing the torque produced by the engine into the motor/generator and an input shaft of the automatic transmission 118. The driving force (driving torque) transmitted to the input shaft of the automatic transmission 118 is transmitted through a transmission output shaft 119 via a propeller shaft (not shown) and a differential (not shown) to drive wheels (not shown). As discussed above, in the parallel hybrid system shown in FIG. 5, a usual hydraulic torque converter is replaced with the electric torque converter 124 constructed by the motor generator 114 and the planetary-gear system 116. From the viewpoint of improved fuel economy, it is desirable to use the electric torque converter instead of the hydraulic torque converter, because of relatively great energy loss in the hydraulic torque converter. Torque multiplication action needed for the torque converter can be attained by a torque assist with the electric motor/generator 114 and also by the planetary-gear system 116.

SUMMARY OF THE INVENTION

However, if a hybrid vehicle with an automatic transmission using an electric torque converter as discussed previously is largely different from usual automotive vehicles in basic design, an immense expenditure of money may be necessary for investment in plant and equipment. It is undesirable from the viewpoint of productivity and marketability. For the reasons set forth above, it is desirable to provide a hybrid unit which can be installed without adding a large change of design to popular automotive vehicles. Therefore, it is preferable to be able to install or arrange an electric torque converter having a substantially same axial dimension as compared to a hydraulic torque converter within the same installation space of the hydraulic torque converter. This is because, generally, a position of an engine crankshaft end, a position of a transmission input shaft end, and a position of a transmission output shaft end are determined depending upon vehicle requirements, that is, the type and dimensions of automotive vehicle. For this reason, an axial length of the engine crankshaft, an axial length of the transmission input shaft and/or an axial length of the transmission output shaft must be shortened, as a design axial length of the electric torque converter increases. Undesirably, the increased design axial length of the electric torque converter requires a large change in basic design of engine and/or transmission. Also, in the hybrid unit employing both an electric motor/generator and a gear mechanism, a dry chamber in which the motor/generator is installed in a fluid-tight fashion and an oil chamber in which the gear mechanism is provided to insure good gear elements operation. As a matter of course, the dry chamber and the oil chamber must be completely separated from each other. As can be seen from the skeleton diagram of the conventional parallel hybrid system shown in FIG. 5, if a partition wall is simply provided between the composition/distribution mechanism (e.g., the single-pinion planetary-gear mechanism 116) and the motor generator 114 in order to divide an internal space of the electric torque converter into the dry chamber and the oil chamber, there is a problem that the design axial length of the electric torque converter becomes longer than that of the hydraulic torque converter (see the layout of the motor generator 114 and the planetary-gear system 116 in the electric torque converter 124 of FIG. 5 or see the layout of a motor generator 5 and a composition/distribution mechanism 6 shown in FIG. 3A).

Accordingly, it is an object of the invention to provide an electric torque converter mounted on a parallel hybrid vehicle, which avoids the aforementioned disadvantages of the prior art.

It is another object of the invention to provide an electric torque converter easily applicable to an automotive vehicle, retaining the same axial dimension as a usual hydraulic torque converter.

In order to accomplish the aforementioned and other objects of the present invention, an electric torque converter mounted on a parallel hybrid vehicle employing a parallel hybrid system, using both an internal combustion engine and an electric motor for propulsion, the electric torque converter comprises an electric motor generator, and a composition-and-distribution mechanism adapted to be located between the engine and a transmission for mechanically combining torque produced by the engine and torque produced by the motor generator with each other and for mechanically distributing the torque produced by the engine into the motor generator and a transmission input shaft of the transmission. A converter case of the electric torque converter comprises a first casing member partitioning the transmission from the electric torque converter, a second casing member located between the engine and the transmission for partitioning the electric torque converter from the exterior, and a third casing member partitioning the motor generator from the composition-and-distribution mechanism and having a large-diameter portion fixedly connected to the first casing member, a medium-diameter portion housing therein the composition-and-distribution mechanism and placing therearound a motor generator rotor of the motor generator so that at least a part of the motor generator rotor overlaps with the composition-and-distribution mechanism in a radial direction, and a small-diameter portion whose inner periphery rotatably supports a rotating shaft arranged coaxially with the transmission input shaft. It is preferable that the electric torque converter may further comprise a one-way clutch located on an inner periphery of the large-diameter portion of the third casing member for inhibiting the transmission input shaft from rotating backward. More preferably, the electric torque converter may further comprise a revolution sensor located between the outer periphery of the third casing member and the inner periphery of the motor generator rotor for sensing a rotor angle of the motor generator rotor.

BRIEF DESCRIPTION OF THE DRAWINGS

FIG. 4 is a simplified skeleton diagram of the parallel hybrid system incorporating the electric torque converter of the embodiment.

DESCRIPTION OF THE PREFERRED EMBODIMENTS

Figure 1:
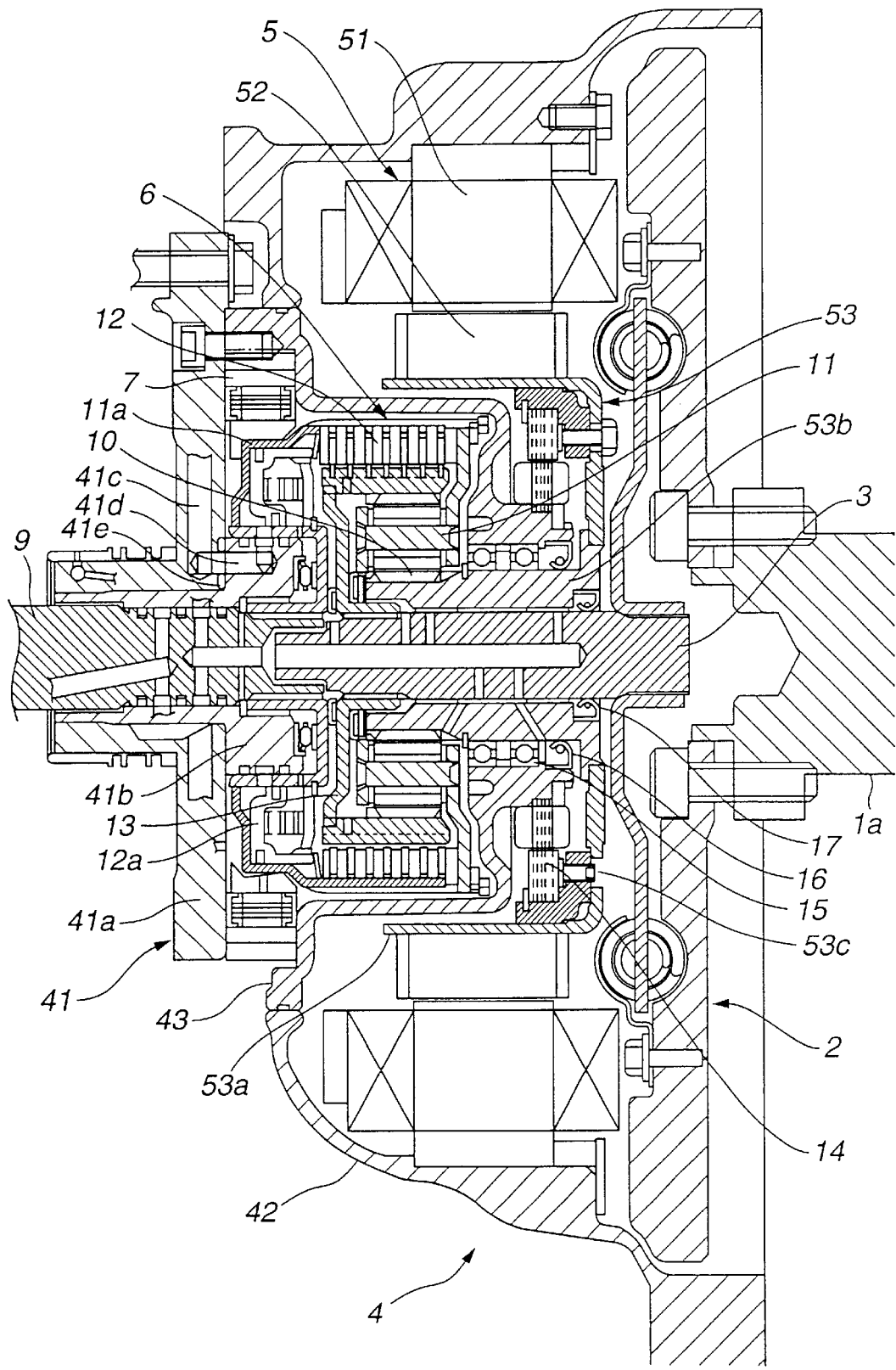
FIG. 1 is a longitudinal cross-sectional view illustrating an embodiment of an electric torque converter.
Figure 2:
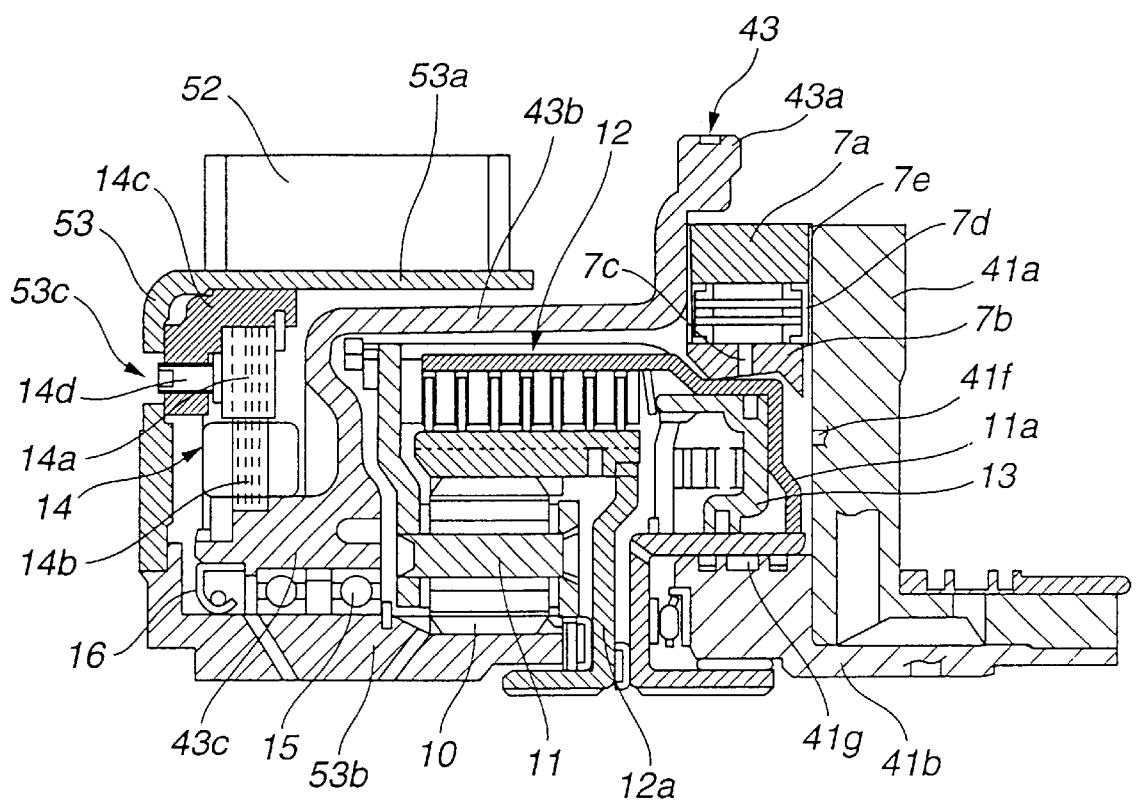
FIG. 2 is a partly-enlarged cross-sectional view showing details of a third casing member of the electric torque converter of the embodiment.

Referring now to the drawings, an electric torque converter 4 of the invention is exemplified in a parallel hybrid system. As seen from the right-hand side of FIG. 1, a damper 2 is fixedly connected to the flanged end of an engine output shaft 1a by means of bolts. By way of spline-connection between external splines of an electric torque converter input shaft 3 and internal splines of the damper 2, the converter input shaft 3 is connected via the damper 2 to the engine output shaft 1a. As illustrated in the substantially central portion of the cross section of FIG. 1, a ring gear 13 is splined to the electric torque converter input shaft 3. A converter case of the electric torque converter 4 is comprised of a first casing member 41, a second casing member 42, and a third casing member 43. The first casing member 41 is bolted to a transmission case (not shown). The second casing member 42 is bolted to both the transmission case and the engine. The third casing member 43 is fixedly connected to the first casing member 41 by means of bolts. As can be seen from FIG. 1, in the shown embodiment, the second and third casing members 42 and 43 are integrally connected to each other. Alternatively, the second and third casing members 42 and 43 may be integrally formed with each other. The first casing member 41 is constructed by two parts, namely a partition wall portion 41a and a drum support portion 41b. The partition wall portion 41a is provided to divide the electric torque converter 4 from a transmission denoted by reference sign 20 in FIG. 4. The drum support portion 41b functions to support both transmission input shaft 9 and drum 11a. The partition wall portion 41a and the drum support portion 41b are integrally connected to each other by way of press-fitting. From the viewpoint of wear and abrasion resistance of the sliding-contact section of the drum support 41b, the drum support 41b is made of steel. On the other hand, the partition wall portion 41a is made of aluminum alloy for lightening. The first casing member 41 is formed therein with oil passages 41c and 41d, to supply hydraulic pressure to a piston 12a and thus to engage a clutch 12. O ring 41e is provided between mating faces of the two parts 41a and 41b in the vicinity of the confluent point between the two oil passages 41c and 41d. To provide tight seal, the O ring 41e is properly crushed in the longitudinal direction when the partition wall portion 41a and the drum support portion 41b are press-fitted to each other. A rotor support 53 is rotatably supported on the third casing member 43 via a ball bearing 15. A motor generator rotor 52 is supported on the outer support portion 53a of the rotor support 53. Sun gear 10 is formed on the outer periphery of an inner support portion 53b of the rotor support 53. As shown in FIG. 2, a revolution sensor 14 is provided between the outer periphery of the third casing member 43 and the rotor support 53. In the electrical torque converter of the embodiment, the revolution sensor 14 is comprised of a resolver. The revolution sensor 14 is constructed by a sensor rotor 14a mounted on the rotor support 53 and a sensor stator 14b mounted on the third casing member 43. Revolution of an electric motor generator 5, such as an angular position of the motor generator, is detected by reading revolution of the sensor rotor 14a, such as rotor angle, by means of the sensor stator 14b. As can be seen from FIG. 1, the revolution sensor 14 is located between the inner periphery of the rotor 52 and the outer periphery of the third casing member 43. Therefore, it is possible to effectively suppress the revolution sensor 14 from being affected by electromagnetic wave noise produced by the motor generator 5. In a similar manner as the motor generator, the revolution sensor 14 is constructed by combining an electromagnetic coil and a magnet. Thus, assuming that the revolution sensor 14 is located close to a stator 51 of the motor generator 5, there is an increased tendency for the revolution sensor 14 to be affected by changes in magnetic field of the stator 51. In this case, it is impossible to accurately detect the rotation angle of the motor generator 5. To avoid this, as discussed above, the revolution sensor 14 is provided between the inner periphery of the rotor 52 and the outer periphery of the third casing member 43. As seen from FIG. 2, the sensor rotor 14a is fixedly connected to a sensor holder 14c by means of both a snap ring (not numbered) and a set screw 14d screwed into a screw hole formed in the sensor holder 14c. As can be seen from the cross sections of FIGS. 1 and 2, the sensor holder 14c is fixedly connected to the rotor support 53 by means of bolts, such as hexagon head bolts whose external threads are screwed into respective internal threads formed in the sensor holder 14c via through openings 53c formed in the rotor support 53. In the shown embodiment, the inside diameter of each of the through openings 53c is dimensioned to be slightly greater than the maximum value of outside diameter (major diameter) of each of the external threads of the bolts. The slightly greater through openings 53c permit relative rotation of the sensor holder 14c to the rotor support 53 under a particular condition where the sensor holder 14c and the rotor support 53 are not tightly fitted to each other by means of bolts. In other words, with the through openings 53c each having the inside diameter somewhat greater than the maximum value of outside diameter of each of the external threads of the bolts, it is possible to easily finely adjust a setting angle of the revolution sensor 14 on the rotor support 53, without removing the rotor support 53. Pinion carrier 11 is connected to the transmission input shaft 9 via the drum 11a. In the electric torque converter of the embodiment, the above-mentioned composition/distribution mechanism 6 includes at least a planetary gear system having the central sun gear 10, the pinion carrier 11, and planet pinions surrounding the sun gear 10. The clutch 12 and the piston 12a are provided in an internal space defined in the drum 11a, such that the clutch 12 is engaged with the ring gear 13 by one axial movement of the piston 12a and disengaged from the ring gear by the opposite axial movement of the piston 12a. An oil seal 16 is placed around the rotating rotor support 53 to prevent oil leakage between the rotor support 53 and the third casing member 43. In a similar manner, an oil seal 17 is placed around the rotating torque converter input shaft 3 to prevent oil between the rotor support 53 and the torque converter input shaft 3. Also, O ring (not numbered) is placed between mating faces of the second and third casing members 42 and 43 to prevent oil leakage from the connecting portion between the second and third casing members. By the use of these seals and O rings, the converter case of the electric torque converter 4 is divided into a dry chamber (that is, a motor generator chamber) and an oil chamber (that is, a composition/distribution mechanism chamber).

As best seen in FIG. 2, the third casing member 43 is constructed by a large-diameter portion 43a, a medium-diameter portion 43b, and a small-diameter portion 43c. One-way clutch 7 is disposed between transmission 20 and composition/distribution mechanism 6 so as to inhibit reverse rotation of the transmission input shaft 9. The one-way clutch 7 has an outer race 7a with external splines formed on the outer periphery thereof, an inner race 7b fixed to the drum 11a, and an engaging unit disposed between the inner and outer races for inhibiting the transmission input shaft 9 from rotating backward during reaction and for allowing it to rotate forward freely when reaction is no longer required. The large-diameter portion 43a of the third casing member 43 has internal splines formed on its inner periphery. With external splines on the outer race 7a and internal splines in the large-diameter portion 43a, the outer race 7a of the one-way clutch 7 is splined to the large-diameter portion 43a of the third casing member. The third casing member 43 is made of aluminum alloy, whereas the outer race 7a is made of steel. Thus, there is a remarkable difference in thermal expansion coefficient and in stiffness. Spline-connection is used to absorb the difference in thermal expansion coefficient and the difference in stiffness and to insure torque transmission between the third casing member 43 and the outer race 7a. In order to fix end bearings 7d in two opposing axial directions, a pair of end plates 7e are sandwiched respectively between the one-way clutch 7 and the partition wall portion 41a of the first casing member 41 and between the one-way clutch 7 and the third casing member 43. The composition/distribution mechanism 6 is located inside of the medium-diameter portion 43b. On the other hand, the rotor 52 of the motor generator 5 is located outside of the medium-diameter portion 43b so that the motor generator rotor overlaps with the composition/distribution mechanism 6 in the radial direction. With this arrangement, the total axial length of the electric torque converter 4 can be shortened. An inner race 7b of the one-way clutch 7 is fixedly connected to the outer peripheral wall of the drum 11a located inside of the medium-diameter portion 43b, by of welding. The inner race 7b is formed with an oil passage 7c so as to lubricate the one-way clutch 7 by hydraulic oil fed through an oil passage 41f formed in the partition wall portion 41a of the first casing member 41. The inner peripheral portion of the small-diameter portion 43c is constructed to rotatably support the rotor support 53 by means of a radial ball bearing 15. The revolution sensor 14 is placed on the outer periphery of the small-diameter portion 43c, thereby effectively shortening the total axial length of the electric torque converter 4.

Figure 3A:
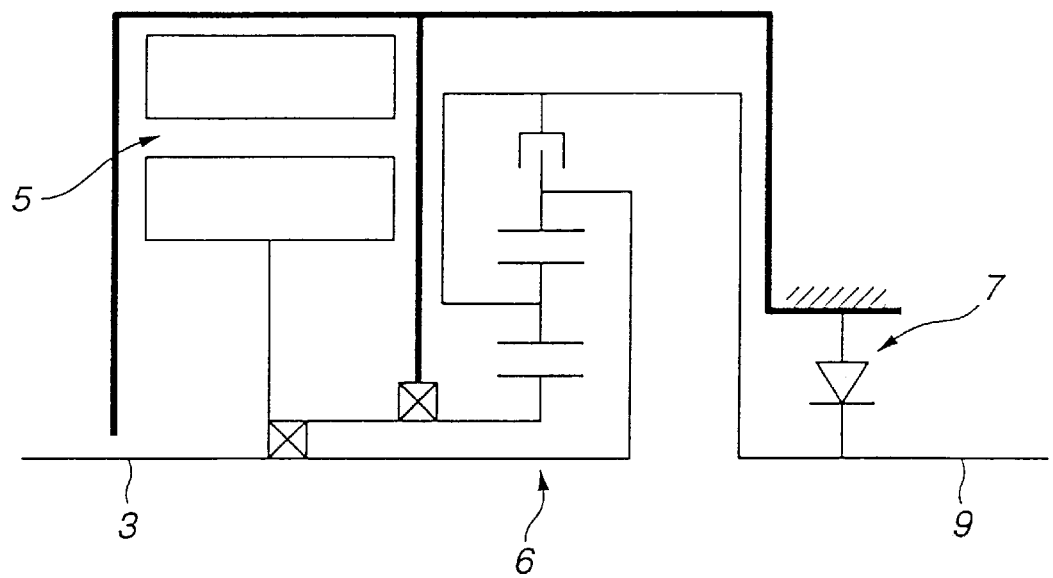
FIG. 3A is a simplified skeleton diagram showing a simple flattened partition-wall structure of the electric torque converter.
Figure 3B:
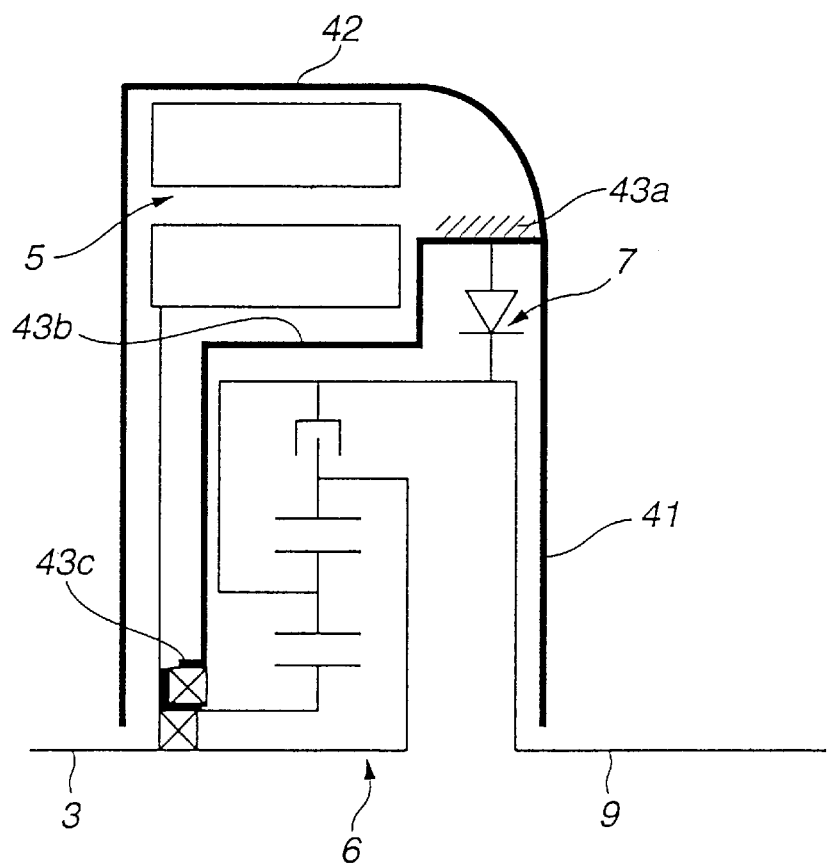
FIG. 3B is a simplified skeleton diagram showing a complicated multi-stepped partition-wall structure applicable to the electric torque converter of the embodiment.
Figure 5:
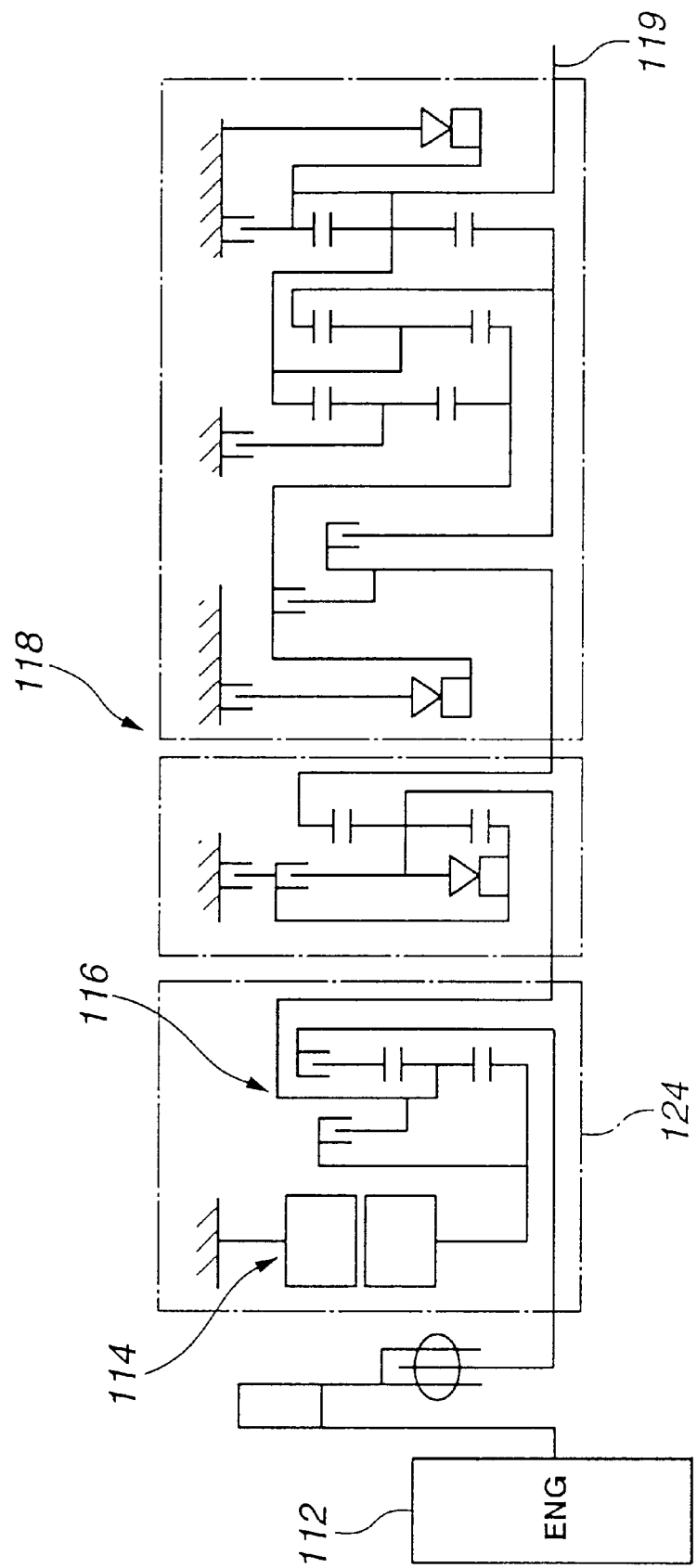
FIG. 5 is a simplified skeleton diagram of the prior art parallel hybrid system.

FIGS. 3A and 3B are conceptual diagrams showing comparison of the simple flattened partition-wall structure and the complicated multi-stepped partition-wall structure. In order to define the dry chamber for the motor generator 5 and the oil chamber for the composition/distribution mechanism 6, in case that the simple flattened partition wall is provided between the motor generator 5 and the composition/distribution mechanism 6 as illustrated in FIG. 3A, the axial length of the electric torque converter 4 becomes considerably long. In this case, it is difficult to lay out the electric torque converter within the same installation space as a usual hydraulic torque converter. On the contrary, in case of the complicated multi-stepped partition wall structure shown in FIG. 3B and used for the electronic torque converter of the embodiment, the complicated multi-stepped partition wall, mainly constructed by the third casing member 43, divides the dry chamber of the motor generator 5 from the oil chamber of the composition/distribution mechanism 6, so that the motor generator 5 surrounds the outer periphery of the composition/distribution mechanism 6. That is, the motor generator 5 and the composition/distribution mechanism 6 overlap with each other in the radial direction, and as a result the total axial length of the electric torque converter 4 can be shortened by an axial length substantially equivalent to the axial length of the motor generator rotor. In addition to the above, in the structure of the electronic torque converter 4, the one-way clutch 7 is located on the inner periphery of the large-diameter portion 43a of the third casing member 43 (the complicated multi-stepped partition wall), such that almost all the one-way clutch 7 is located around the composition/distribution mechanism 6. Therefore, it is possible to further shorten the total axial length of the electrical torque converter 4 by the axial length of the one-way clutch 7.

Referring now to FIG. 4, there is shown the skeleton diagram of the parallel hybrid system on which the electric torque converter of the embodiment is mounted. During engine start-up, the motor generator 5 is driven in the reverse-rotation direction as a starter motor. The term "reverse-rotation" of the motor generator means a rotational direction opposite to the rotational direction of the engine, whereas the term "normal rotation" of the motor generator means the same rotational direction as the engine. At this time, the engine is started up under a specified condition where the rotational motion of the pinion carrier 11 is stopped by means of the one-way clutch 7, while the ring gear 13 is rotated in the normal-rotation direction. On the other hand, when the transmission 20 is maintained at its neutral gear range position N in which no driving torque is transmitted, the engine may be started up by driving the motor generator in the normal-rotation direction with the clutch 12 engaged.

During the starting period, the engine is started or propelled by producing motor torque by the motor generator 5, so that the motor torque value is suitable for torque output of the engine 1. Concretely, the rotational-speed difference between the engine 1 and the motor generator 5 is gradually reduced, while smoothly increasing the rotational speed of the pinion carrier 11. When the rotational-speed difference is reduced to below a predetermined small value, the clutch 12 is engaged, and thus the starting operation is completed. After the starting operation has been completed, in the same manner as a lock-up state of a usual hydraulic torque converter with a lock-up clutch, the parallel hybrid vehicle is propelled or driven in a directly-coupled state where the engine output shaft 1a is coupled directly with the transmission input shaft 9. In the directly-coupled state, as occasion demands, the power-assist mode or the electric power generation mode is selected. When the vehicle is decelerating, the motor generator 5 is operated at the regenerative braking mode, for energy regeneration (that is, recovery of kinetic energy of the vehicle in the form of electric energy). For the purpose of efficiently recovering a large amount of energy, during vehicle deceleration, the engine 1 may be stopped.

As will be appreciated from the above, the transmission 20 is partitioned from the electronic torque converter 4 by means of the first casing member 41, and the electronic torque converter 4 is partitioned from the exterior between the engine 1 and the transmission 20 by means of the second casing member 42, and the motor generator 5 is partitioned from the composition/distribution mechanism 6 by means of the third casing member 43. The third casing member 43 is constructed by the large-diameter portion 43a fixedly connected to the first casing member 41, the medium-diameter portion 43b housing therein the composition/distribution mechanism 6 and placing therearound the motor generator rotor 52 so that at least a part of the motor generator rotor overlaps with the composition/distribution mechanism 6, and the small-diameter portion 43c whose inner periphery rotatably supports the motor generator rotor support 53, arranged coaxially with the transmission input shaft 9. This ensures the reduced total axial length of the electric torque converter 4. Therefore, it is possible to easily install the electric torque converter within the same installation space as a usual hydraulic torque converter. That is, the usual hydraulic torque converter can be easily replaced with the electric torque converter, and thus there is no necessity for a change in basic design of the transmission. Furthermore, the one-way clutch 7 that inhibits the transmission input shaft from rotating backward, is located on the inner periphery of the large-diameter portion 43a of the third casing member 43 and between the composition/distribution mechanism 6 and the transmission 20. That is, by laying out the one-way clutch 7 at the maximum outside-diameter portion (the large-diameter portion), the one-way clutch 7 can be constructed in such a manner as to overlap with the composition/distribution mechanism 6 in the radial direction. This ensures a more effectively shortened axial length of the electrical torque converter 4. Moreover, the revolution sensor 14, such as the resolver, is compactly arranged between the inside of the motor generator rotor 52 and the outside of the third casing member 43 (in particular, the small-diameter portion 43c). Therefore, it is possible to suppress or reduce electromagnetic wave noise produced by the motor generator 5, while shortening the axial length of the electric torque converter 4.

While the foregoing is a description of the preferred embodiments carried out the invention, it will be understood that the invention is not limited to the particular embodiments shown and described herein, but that various changes and modifications may be made without departing from the scope or spirit of this invention as defined by the following claims.

What is claimed is:

1. An electric torque converter mounted on a parallel hybrid vehicle employing a parallel hybrid system, using both an internal combustion engine and an electric motor for propulsion, said electric torque converter comprising:

an electric motor 5 generator;

a composition-and-distribution mechanism adapted to be located between the engine and a transmission for mechanically combining torque produced by the engine and torque produced by the motor generator with each other and for mechanically distributing the torque produced by the engine into the motor generator and a transmission input shaft of the transmission; and a converter case of said electric torque converter comprising:

(a) a first casing member partitioning the transmission from the electric torque converter;

(b) a second casing member located between the engine and the transmission for partitioning the electric torque converter from an exterior; and (c) a third casing member partitioning the motor generator from the composition-and-distribution mechanism, and having a large-diameter portion fixedly connected to the first casing member, a medium-diameter portion housing therein the composition-and-distribution mechanism and placing therearound a motor generator rotor of the motor generator so that at least a part of the motor generator rotor overlaps with the composition-and-distribution mechanism in a radial direction, and a small-diameter portion whose inner periphery rotatably supports a rotating shaft arranged coaxially with the transmission input shaft.

2. The electric torque converter as claimed in claim 1, wherein said rotating shaft comprises a motor generator rotor support which supports the motor generator rotor on an outer periphery thereof.

3. The electric torque converter as claimed in claim 1, which further comprises a one-way clutch disposed between the composition-and-distribution mechanism and the transmission for inhibiting the transmission input shaft from rotating backward, and located on an inner periphery of the large-diameter portion of the third casing member.

4. The electric torque converter as claimed in claim 3, wherein the one-way clutch is located on the inner periphery of the large-diameter portion, so that the one-way clutch is located around the composition-and-distribution mechanism.

5. The electric torque converter as claimed in claim 4, wherein the one-way clutch has an outer race made of steel and the third casing member is made of aluminum alloy, and wherein the large-diameter portion of the third casing member has internal splines and the outer race of the one-way clutch has external splines for spline-connection between the outer race and the large-diameter portion.

6. The electric torque converter as claimed in claim 1, which further comprises a revolution sensor located between the outer periphery of the third casing member and the inner periphery of the motor generator rotor for sensing a rotor angle of the motor generator rotor.

7. The electric torque converter as claimed in claim 6, wherein the revolution sensor is located between the outer periphery of the small-diameter portion of the third casing member and the inner periphery of the motor generator rotor support.

* * * * *